Figure 1:
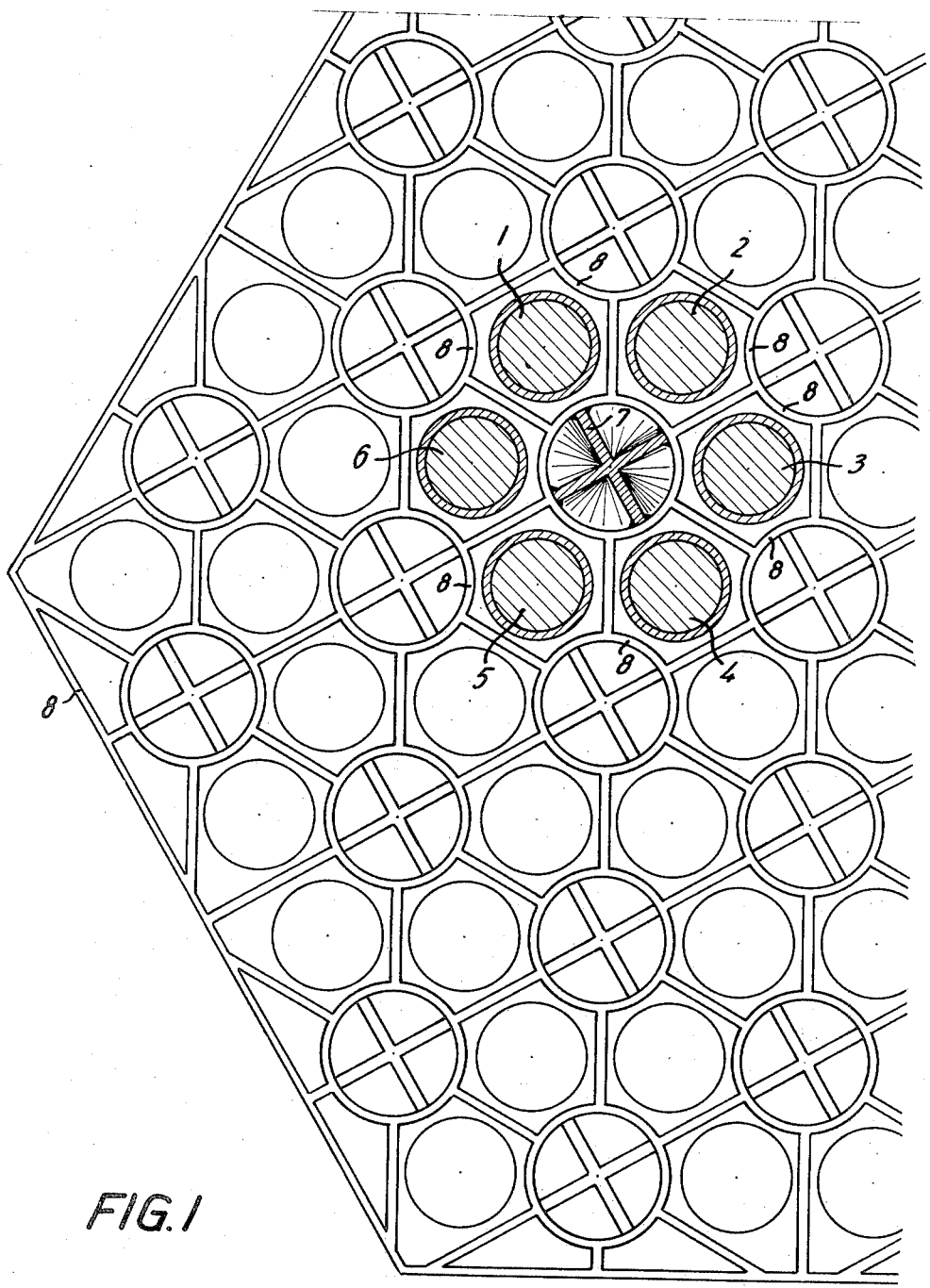

United States Patent [19]

Marstrand

[11] 3,787,285

[45] Jan. 22, 1974

[54] FUEL ASSEMBLY FOR A NUCLEAR REACTOR AND A NUCLEAR REACTOR CORE COMPRISING SUCH FUEL ASSEMBLIES

[75] Inventor: Jorgen Marstrand, Gentofte, Denmark

[73] Assignee: Atomenergikommissionen, Copenhagen, Denmark

[22] Filed: Feb. 8, 1971

[21] Appl. No.: 113,242

[30] Foreign Application Priority Data

Feb. 13, 1970 Denmark .................................. 721

[52] U.S. Cl. .................................. 176/78, 176/54
[51] Int. Cl. ................................................ G21c 3/32
[58] Field of Search ............. 176/76, 78, 79, 54, 55

[56] References Cited
UNITED STATES PATENTS

| | | | |
|---|---|---|---|
| 3,663,367 | 5/1972 | Calvin .................................. | 176/78 |
| 2,948,517 | 8/1960 | Cosner .................................. | 176/78 X |
| 3,379,619 | 4/1968 | Andrews et al. .................... | 176/76 X |
| 3,393,128 | 7/1968 | Obertelli et al. .................... | 176/78 |
| 3,607,639 | 9/1971 | Santen et al. ...................... | 176/78 |

FOREIGN PATENTS OR APPLICATIONS

| | | | |
|---|---|---|---|
| 1,434,932 | 3/1966 | France .................................. | 176/78 |
| 1,519,657 | 5/1968 | France .................................. | 176/78 |
| 942,591 | 11/1963 | Great Britain ....................... | 176/78 |

Primary Examiner—Carl D. Quarforth
Assistant Examiner—E. E. Lehmann

[57] ABSTRACT

A fuel assembly in which the fuel rods are arranged in a hexagonal or square, regular pattern, but in which single rods are omitted systematically and deflectors substituted therefor, each deflector normally being situated in a duct, the partition of which consists of six or eight fuel rods, respectively. The deflectors are rigidly connected to grids between the fuel rods so that the rods may expand freely in the grids.

8 Claims, 4 Drawing Figures

FUEL ASSEMBLY FOR A NUCLEAR REACTOR AND A NUCLEAR REACTOR CORE COMPRISING SUCH FUEL ASSEMBLIES

The present invention relates to a fuel assembly for a nuclear reactor with parallel fuel rods, the points of intersection of the axes of which with a plane perpendicular to the fuel rods form a regular pattern of points which constitutes the corner points in a plane configuration of adjacent, regular figures in the reactor lattice in the form of equilateral triangles or squares and having deflectors, the axes of which are parallel to the fuel rods and impart a vortical motion to the coolant flowing along the deflectors.

An evaulation of the economy of nuclear power stations shows that fuel costs are relatively low, for example, for a boiling heavy water reactor, they are of the order of magnitude of 0.1 cent per kwh. With a fixed price of fissile material, e.g., uranium, it will be possible to achieve savings in fuel through a lower production price, lower enrichment costs and a better burn-up, but it will hardly be possible to significantly reduce the fuel share in the kwh price. The basis of the present invention is the recognition that if material savings are to be achieved, this will first and foremost be by a reduction in the plant cost put in relation to the net effect of the nuclear reactor. As the plant costs do not rise proportionally with the net power, the possibility of increasing the net power exists, but this results in other drawbacks as, for instance, the fact that suspension of operation acquires far greater economic consequences and that smaller countries are not going to be able to fit such big nuclear power stations into their existing electricity supply network.

It is an object of the present invention to provide a fuel assembly permitting a higher energy flux density than hitherto knwon and thereby to reduce the plant costs.

It is the aim of all designers of nuclear reactors to achieve maximum power for a given core size, vide e.g., Danish patent specification NO. 109,158. For boiling water reactors, it is the so-called burn-up or critical heat flux that has so far imposed the limit.

For reactors operating with natural coolant circulation, the limits for increasing the energy flux density are rather narrow.

It is possible to significantly increase the energy flux density by forced circulation, however, very big and expensive pumps will be required. The maintenance costs of such pumps cannot be estimated until they have been built and worked for some time.

A boiling water reactor is known, having a reactor lattice in which the fuel rods are arranged in a quadratic pattern and where, parallel to the fuel rods in the center of each square, there are deflectors in the form of twisted strips, vide, for example, French patent specification No. 1,369,408. This feature provides the possibility of increasing the energy flux density, but the construction is difficult to accomplish in practice.

It is a further object of the present invention to provide an increase in the energy flux density and a structure of greater simplicity and stability.

A fuel assembly according to the invention, is characterized in that in a group of figures in the reactor lattice adjacent to each other, be they groups each consisting of six equilateral triangles, the outer corner points of which, between them, form a regular, hexagonal pattern of points, or groups each consisting of four squares, the outer corner points of which, between them, form a bigger quadratic pattern of points, there are fuel rods in the outer points of each individual group, while in the common inner point of the group there is only a deflector.

This geometrical description of a bundle of parallel fuel rods in a fuel assembly implies that the fuel assembly may be regarded as a bunch of ducts, the wall of which, apart from the marginal zone, consists of eight or six fuel rods, respectively, depending upon whether it is a question of fuel rods that are disposed in the points of intersection of a quadratic or a triangular net pattern.

In a preferred embodiment of the fuel assembly according to the invention, the deflectors pass through and are secured to grids which serve to keep the rods in the transverse direction but permit the rods to move in the longitudinal direction. By constructing the grids with annular parts in which the deflectors are secured, it is possible in this invention to mount the deflectors without regard to which position the deflecting means occupy relative to the axis.

Figure 2:
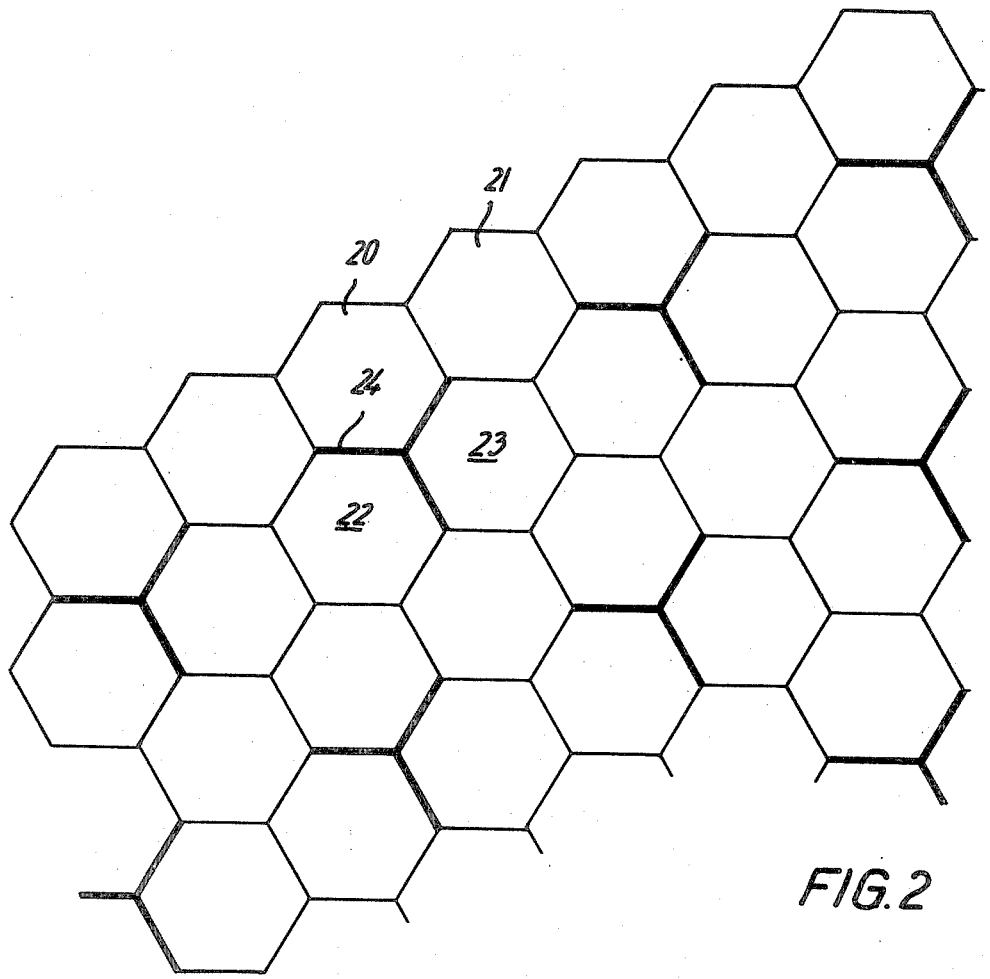
Figure 3:
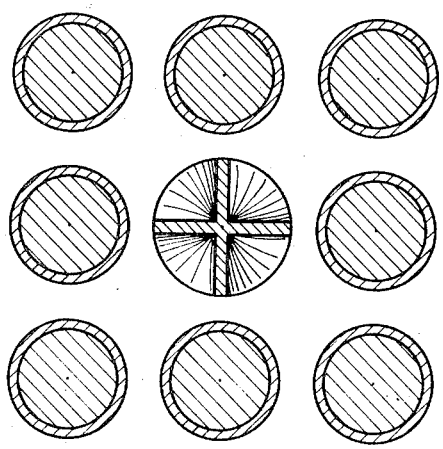
Figure 4:
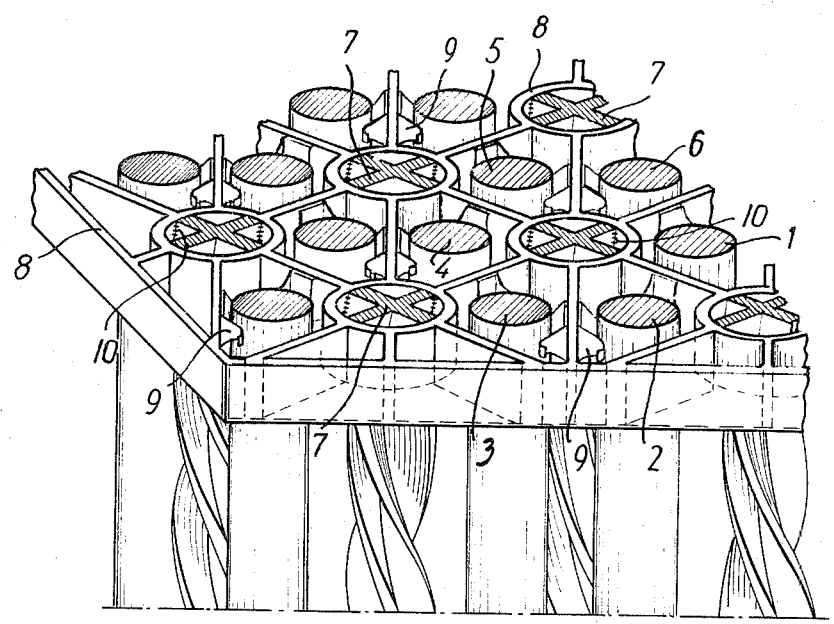

In the following, the invention is explained with reference to the accompanying, purely schematical drawings, in which FIG. 1 shows in horizontal plane view a portion of an embodiment of a fuel assembly according to the invention with parallel, circular cylindrical fuel rods disposed in a hexagonal pattern, six of the rods and the deflector they surround being shown in section, FIG. 2 shows a part of a nuclear reactor core composed of a plurality of fuel assemblies like the one illustrated in FIG. 1, FIG. 3 shows a portion of a fuel assembly with parallel, circular cylindrical fuel rods disposed in a quadratic pattern, and FIG. 4 shows a perspective view of a part of a fuel assembly.

The fuel assembly, a portion of which is shown in FIG. 1 contains 60 circular-cylindrical fuel rods arranged in a hexagonal pattern in such a way that the outer contour of the fuel assembly in section at right angles to the axes of the fuel rods is hexagonal. This shape renders the fuel assembly well-suited for the construction of a nuclear reactor core, as is schematically shown in FIG. 2, where a plurality of hexagonal fuel assemblies according to the invention are grouped together to form a part of a nuclear reactor core.

FIG. 1 shows, for the sake of clearness, a section through six fuel rods 1, 2, 3, 4, 5 and 6 arranged in a hexagonal pattern, and through a deflector 7, The group of six fuel rods forms a duct or passage containing the deflector 7. Since these fuel rods can be of a type known per se, their construction need not be described in greater detail here. They may, by way of example, as the designation in the figure indicates, consist of a circular-cylindrical can which is filled with fissile material.

It will be seen that each of the fuel rods, besides forming part of the group marked by hatching, also forms part of a neighboring group. The marginal groups comprise less than six fuel rods.

In the embodiment illustrated in FIG. 1 the deflector 7, which is mounted in the center of the duct formed by the six surrounding fuel rods, is a sectional rod of cruciform cross section, and comprising four helical blades which impart a vortical motion around the axis of the duct or passage to a coolant flowing through the duct. By means of this vortical motion, a separation of steam and water takes place, since the steam, due to the vortical motion, moves towards the axis of the duct or passage, while the liquid moves outwards toward the surrounding fuel rods. The systematic provision of space for the steam and in the above described manner permits a greater energy flux density.

The fuel rods and the deflectors which at the top are fastened in a holder or the like, not shown, pass through supporting means or grids 8 mounted at suitable points in the longitudinal direction of the fuel assembly. Spring members 9 and/or other fixing means are provided on those parts of the grids surrounding the rods in a manner known per se. They fix the position of the parallel fuel rods in relation to each other but permit displacement of any rod in the axial direction. As such means are known, they are not going to be described in greater detail here and, for the sake of clearness, they are only shown in FIG. 4 of the drawings, in which FIG. 1-3 are meant first and foremost to show the reactor lattice, viz. the configuration of the fuel rods and deflectors in patterns of isosceles and squares, respectively. These isosceles triangles are preferably, as shown in FIG. 1, in the form of equilateral triangles.

The deflectors 7 are rigidly connected to the supporting means or grids, for instance, by welding 10 as shown in FIG. 1 and 4. Consequently, the grids follow the deflectors in their expansion and contraction in the axial direction. The structure comprising a number of grids distributed in the axial direction of the assembly and a number of deflectors welded to the grids this structure is easy to construct is mechanically stable and the fuel rods can expand freely in the axial direction but are held in correct interrelationship by the grids.

Those parts of the grids 8, through which the deflectors pass are, in the embodiment shown, constructed as circular-cylindrical rings, which facilitates an easier mounting because the deflectors can assume any angular position in the rings and thus may abut against any points of the inside of the rings before they are welded to the rings.

The height of the grids in the axial direction of the fuel assembly is low as compared to the length of the fuel rods, as they correspond essentially to the height of conventional grids.

In the example shown, te deflector 7 has four blas, but it is possible to employ a different number, for example, three or more. The pitch of the helical surfaces can be constant, but it may also vary along the axis of the deflector in order to thereby make allowance for the varying steam content which increases in the direction of the topmost end of the fuel assembly.

In FIG. 2, a plurality of fuel assemblies is shown, like the ones shown in FIG. 1, grouped together to form a part of a nuclear reactor core. Four of the fuel assemblies are denoted with reference designations 20, 21, 22, and 23. At suitable points between the fuel assemblies and preferably in a regular pattern, control rods are fitted, of which one marked with 24 is situated between the fuel units 20, 22 and 23. The axially movable control rods have a Y-shaped cross section, but are otherwise of the conventional type and need therefore not be described in greater detail here.

In FIG. 3, a group of eight fuel rods are schematically shown mounted in a quadratic pattern with a deflector located in the duct or passage formed by the fuel rods. The construction of a fuel assembly of groups as shown in FIG. 3 is, moreover, analogous to what has been described in connection with FIG. 1, and the compounding of a plurality of quadratic fuel assemblies into a quadratic nuclear reactor core is analogous to what has been described in connection with FIG. 2.

By employing a fuel assembly according to the invention in a boiling light water reactor, an energy flux density is obtained which corresponds essentially to the energy flux density which can be obtained in a pressure water reactor. A corresponding increase in the energy flux density occurs in a heavy water reactor. In both cases, this results in smaller dimensions of the reactor core for a given energy.

Particularly when employing the fuel assembly according to the invention in a boiling heavy water reactor, the economic advantage will be appreciable because there is going to be a significant drop in the heavy water investment.

The reason that employing the fuel assembly according to the invention results in a greater energy flux density is because in the first place, the special configuration of the fuel rods and deflectors, better conditions with respect to space are created for the steam developed in the course of the operation with the result that a higher slip ratio is achieved, that is to say the ratio between the steam velocity and the water velocity. The deflectors result in a water-steam separation, so that a significant part of the separation is carried out inside the reactor core.

Compared with the said prior art construction, it is a substantial advantage that the structure according to the invention, thanks to the configuration chosen, is easy and inexpensive to construct. The complete assembly constitutes a structure which is stronger when compared with conventional rod bundle fuel cells and, in all other aspects, is equivalent to these.

In comparison with the prior art structure, in which the rods are mounted in a quadratic pattern of points, the structure according to the present invention has a plurality of through ducts or passages of a relatively large cross section area. The advantage of this is that the flow resistance, that is to say the drop in pressure, is reduced or, conversely, it is possible to achieve higher steam velocities as compared to the prior art structure which means higher slip ratios and, consequently, lower void as well as better conditions with respect to water-steam separation. From the point of view of neutron physics, it is an advantage that the void, put in relation to the energy flux density, becomes lower than normal.

The provision of sufficiently large steam passages or steam ducts is of particular importance in the upper part of the reactor core and contributes to reducing pressure losses and increasing the burn-out limit of the fuel unit.

Expediently, the deflectors are constructed as extruded sections having, for instance, three or four blades twisted with a suitable pitch, that is to say a pitch which ensures, in the given conditions, that the flow of steam following the axis of the duct is rid of its water content. The separated water is swirled out in the direction of the rods, on which it forms a film of water and ensures a good heat transmission and, thereby, prevents burn-out from taking place at the loads normally occurring.

Many different embodiments are feasible within the scope of the invention which is not restricted to those illustrated. The mounting of the fuel rods and the deflectors in a holder at the top may be of any suitable kind known per se, for example, by screwing or clamping.

I claim:

1. A fuel assembly for a boiling water nuclear reactor comprising:
   a plurality of parallel fuel rods arranged in groups in a regular repeating geometric figure,
   each group having a center,
   an elongated deflector surrounded at a distance by at least six fuel rods for deflecting a steam-water mixture flowing in its axial direction and thereby causing a substantial separation of water from steam by that deflector,
   the axis of said elongated deflector containing said centers and being generally parallel with axes of the surrounding fuel rods,
   a plurality of grids axially spaced apart on the assembly interconnecting said groups so as to permit axial expansion of the rods while supporting them against movement perpendicular to their axes, said grids having a pluraltiy of annular parts into which the deflectors fit,
   said elongated deflector passing through said plurality of grids.

2. The assembly of claim 1 in which said geometric figure is an isosceles triangle, each deflector being in the vertex of a group having six surrounding fuel rods, each of which also forms part of an adjacent group.

3. The assembly of claim 1 in which said geometric figure is a square, each deflector being in a group having eight surrounding fuel rods, each of which is also a part of an adjacent group.

4. The assembly of claim 1 in which comprise a plurality of annular parts into which the said annular parts are joined together by segments which define positions for holding said fuel rods.

5. The assembly of claim 1 in which the deflectors are generally helical in shape.

6. The assembly of claim 5 in which the deflectors are helical so as to force water to their peripheries while permitting generally axial passage of steam.

7. The assembly of claim 1 in which the deflectors are of approximately the same length as the rods.

8. The assembly of claim 1 in which the deflectors are extruded sections having at least three vanes twisted in a helical pitch.

* * * * *